US008086555B2

(12) United States Patent  
Pan et al.

(10) Patent No.: US 8,086,555 B2  
(45) Date of Patent: Dec. 27, 2011

(54) COLLABORATIVE FILTERING SYSTEMS AND METHODS

(75) Inventors: Rong Pan, Mountain View, CA (US); Rajan Lukose, Oakland, CA (US); Martin B. Scholz, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 549 days.

(21) Appl. No.: 12/359,167

(22) Filed: Jan. 23, 2009

(65) Prior Publication Data

US 2010/0191694 A1    Jul. 29, 2010

(51) Int. Cl.
*G06F 9/44* (2006.01)
*G06N 7/02* (2006.01)
*G06N 7/06* (2006.01)

(52) U.S. Cl. ......................................................... 706/52

(58) Field of Classification Search ...................... 706/52
See application file for complete search history.

(56) References Cited

U.S. PATENT DOCUMENTS

| | | | |
|---|---|---|---|
| 7,023,979 B1 * | 4/2006 | Wu et al. ................... | 379/265.11 |
| 7,240,055 B2 * | 7/2007 | Grasso et al. .......................... | 1/1 |
| 7,676,034 B1 * | 3/2010 | Wu et al. ................... | 379/265.01 |
| 7,840,986 B2 * | 11/2010 | Ali et al. ........................ | 725/105 |

OTHER PUBLICATIONS

Feature-based prediction of unknown preferences for nearest-neighbor collaborative filtering, Hyungil Kim; Juntae Kim; Herlocker, J.; Data Mining, 2004. ICDM '04. Fourth IEEE International Conference on Digital Object Identifier: 10.1109/ICDM.2004.10071 Publication Year: 2004 , pp. 435-438.*
Recommender System Framework Using Clustering and Collaborative Filtering, Mittal, N.; Nayak, R.; Govil, M.C.; Jain, K.C.; Emerging Trends in Engineering and Technology (ICETET), 2010 3rd International Conference on Digital Object Identifier: 10.1109/ICETET.2010.121 Publication Year: 2010 , pp. 555-558.*
An Item Based Collaborative Filtering Recommendation Algorithm Using Rough Set Prediction, Ping Su; HongWu Ye; Artificial Intelligence, 2009. JCAI '09. International Joint Conference on Digital Object Identifier: 10.1109/JCAI.2009.155 Publication Year: 2009 , pp. 308-311.*
A Movie Rating Prediction Algorithm with Collaborative Filtering, Fikir, O.B.; Yaz, I.O.; Özyer, T.; Advances in Social Networks Analysis and Mining (ASONAM), 2010 International Conference on Digital Object Identifier: 10.1109/ASONAM.2010.64 Publication Year: 2010 , pp. 321-325.*
Adomavicius et al., Toward the Next Generation of Recommender Systems: A Survey of the . . . , IEEE Transactions on Knowledge and Data Engineering, 17(6), 2005, pp. 734-749.
Azar et al., Spectral Analysis of Data, STOC'01, 2001, Hersonissos, Crete, Greece, pp. 619-626.
Batista et al., A Study of the Behavior of Several Methods for Balancing Machine Learning Training Data, Sigkdd Explorations, vol. 6, Issue 1, 2004, pp. 20-29.

(Continued)

*Primary Examiner* — Michael B Holmes

(57) ABSTRACT

A collaborative filtering method for evaluating a group of items to aid in predicting utility of items for a particular user comprises assigning an item value of either known or missing to each item of the group of items, and applying a modification scheme to the item values of the missing items to assign a confidence value to each of the item values of the missing items to thereby generate a group of modified item values. The group of items having modified item values and the group known items are evaluated to generate a prediction of utility of items for a particular user.

20 Claims, 2 Drawing Sheets

OTHER PUBLICATIONS

Ben-David et al., Learning Distributions by their Density Levels—A Paradigm for Learning Without a Teacher, J. Comput. Syst. Sci., 55:171-182, 1997.

Breese et al., Empirical Analysis of Predictive Algorithms for Collaborative Filtering, Technical Report MSR-TR-98-12, Microsoft Research, Microsoft Corp., (1998), pp. 1-20.

Breiman, Bagging Predictors, Machine Learning, 24, 1996, pp. 123-140.

Chawla et al., Editorial: Special Issue on Learning from Imbalanced Data Sets, Sigkdd Explorations, vol. 6, Issue 1, 2004, pp. 1-6.

Das et al., Google News Personalization: Scalable Online Collaborative Filtering, /WWW2007/Track: Industrial Practice and Experience, 2007, Banff, Alberta, Canada, pp. 271-280.

Denis, PAC Learning from Positive Statistical Queries, M.M. Richter et al. (Eds.): Algorithmic Learning Theory, 1998, LNAI 1501, pp. 112-126.

Gabriel et al., Lower Rank Approximation of Matrices by Least Squares With Any Choice of Weights, Technometrics, vol. 21, No. 4, 1979, pp. 489-498.

Heckerman et al., Dependency Networks for Inference, Collaborative Filtering, and Data Visualization, Journal of Machine Learning Research 1, 2000, pp. 49-75.

Herlocker et al., Evaluating Collaborative Filtering Recommender Systems, ACM Transactions on Information Systems, vol. 22, No. 1, 2004, pp. 5-53.

Kelly et al., Implicit Feedback for Inferring User Preference: A Bibliography, SIGIR Forum, 37, 2003, pp. 18-28.

Lee et al., Learning with Positive and Unlabeled Examples Using Weighted Logistic Regression, ICML, 2003, Washington DC, pp. 448-455.

Liu et al., Exploratory Under-Sampling for Class-Imbalance Learning, IEEE Computer Society, 2006, pp. 965-969.

Marlin et al., Collaborative Filtering and the Missing at Random Assumption, UAI, 2007.

Drummond et al., C4.5, Class Imbalance, and Cost Sensitivity: Why Under-Sampling beats Over-Sampling, Workshop on Learning from Imbalanced Datasets II, ICML, 2003.

Raskutti et al., Extreme Re-balancing for SVMs: a case study, Sigkdd Explorations, vol. 6, Issue 1, pp. 60-69.

Salakhutdinov et al., Restricted Boltzmann Machines for Collaborative Filtering, ICML, vol. 227 of ACM International Conference Proceeding Series, 2007, pp. 791-798.

Scholkopf et al., Estimating the Support of a High-Dimensional Distribution, Neural Computation 13, 2001, Massachusetts Institute of Technology, pp. 1443-1471.

Srebro et al., Weighted Low-Rank Approximations, Proceedings of the Twentieth International Conference on Machine Learning, ICML, AAAI Press, 2003, pp. 720-727.

Weiss, Mining with Rarity: A Univying Framework, Sigkdd Explorations, vol. 6, Issue 1, 2004, pp. 7-19.

Yu et al., PEBL: Positive Example Based Learning for Web Page Classification Using SVM, Sigkdd, 2002, ACM 1-58113-567-X/02/0007, pp. 239-248.

Zhang, et al., Using Singular Value Decomposition Approximation for Collaborative Filtering, CEC, 2005, IEEE Computer Society, pp. 257-264.

Zhou et al., Large-Scale Parallel Collaborative Filtering for the Netflix Prize, AAIM, 2008, LNCS 5034, pp. 337-348.

Nigam et al., Analyzing the Effectiveness and Applicability of Co-Training, CIKM, 2000, McLean, VA, ACM 1-58113-320-0/00/11, pp. 86-93.

Kurucz et al., Who Rated What: a combination of SVD, correlation and frequent sequence mining, KDDCup, 2007, ACM 978-1-59593-834-3/07/0008.

Vitter, Faster Methods for Random Sampling, Research Contributions, ACM 0001-0782/84/0700-0703, vol. 27, No. 7, 1984, pp. 703-718.

Ward et al., Presence-only data and the EM algorithm, Biometrics, 2008.

Schwab et al., Learning User Interests through Positive Examples Using Content Analysis and . . . , Draft from Fraunhofer Inst. for Applied Information Technology, Germany, 2001.

Funk, Netflix Update: Try this at home, http://sifter.org/~simon/journal/20061211.html, Dec. 11, 2006.

\* cited by examiner

COLLABORATIVE FILTERING SYSTEMS AND METHODS

BACKGROUND

Many applications of collaborative filtering (CF), such as news item recommendation and bookmark recommendation, are most naturally thought of as one-class collaborative filtering problems. In these problems, the "training" data often consists simply of binary data reflecting a user's action or inaction, such as page visitation in the case of news item recommendation, or whether or not a user has bookmarked a page in the bookmarking scenario. At the scale of the web, this type of data is extremely sparse.

Because of this sparsity, there is an ambiguity in the interpretation of the so-called negative examples. For example, one cannot really attribute a user's inaction of not bookmarking a webpage to a lack of interest in the page as opposed to a simple lack of awareness of the page. In other words, negative examples and unlabeled positive examples are combined together, and it is typically not possible to distinguish between them.

Labeling negative examples to convert them into a classical CF problem is very expensive, or even intractable, because users simply do not wish to bear the burden of doing so. Previous research addressing this one-class problem only considered it as a classification task. However, little work has been done on this problem in the CF setting.

DETAILED DESCRIPTION

Figure 1:
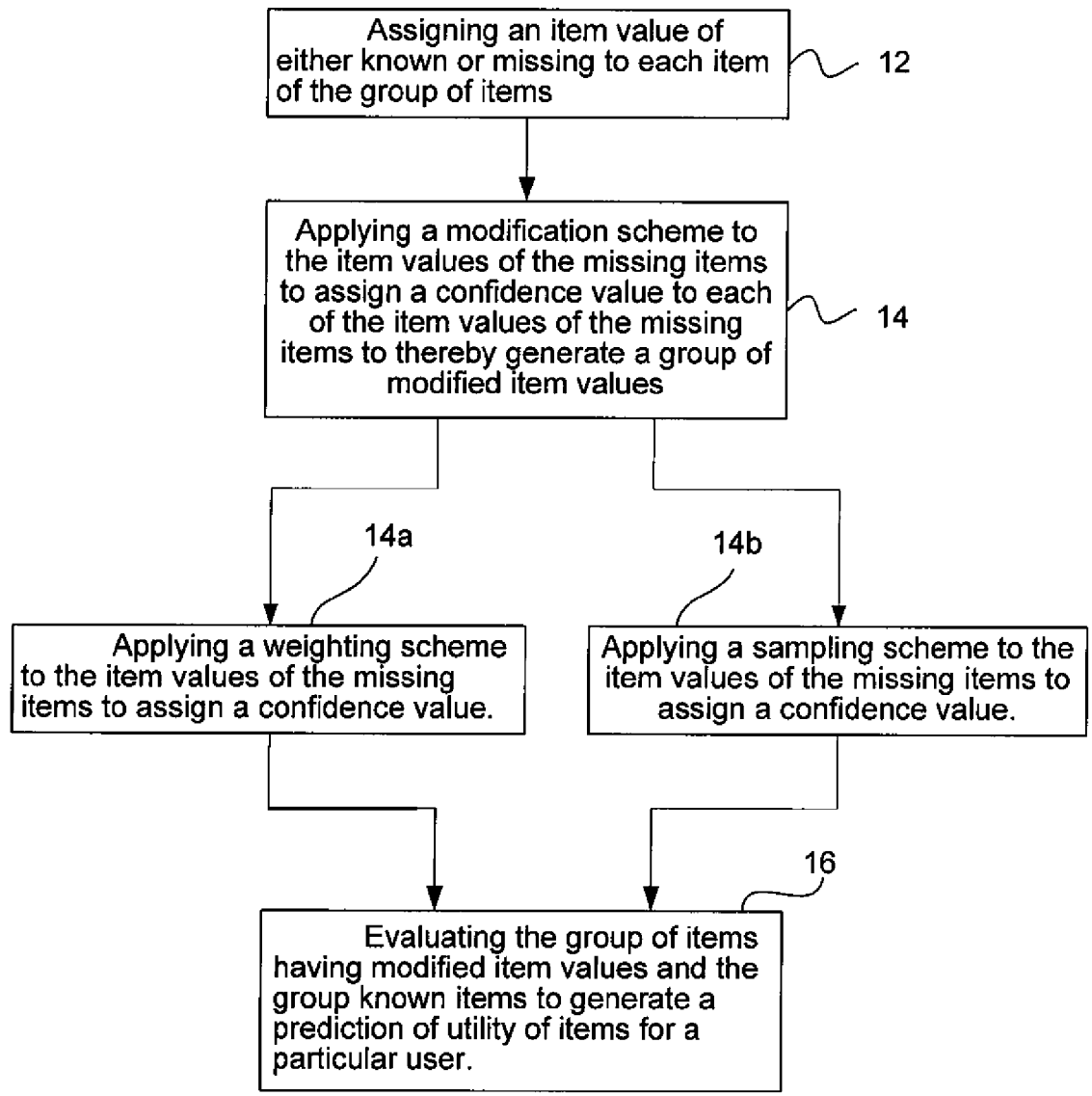
FIG. 1 is a flow chart illustrating a collaborative filtering method for evaluating a group of items to aid in predicting utility of items for a particular user.

Alterations and further modifications of the inventive features illustrated herein, and additional applications of the principles of the inventions as illustrated herein, which would occur to one skilled in the relevant art and having possession of this disclosure, are to be considered within the scope of the invention. The same reference numerals in different drawings represent the same element.

Personalized services are becoming increasingly indispensable on the web, ranging from providing search results to product recommendation. Commercial examples of such systems include recommending products at Amazon.com™, DVDs at Netflix™, News by Google™, etc. The central technique used in these systems is collaborative filtering (CF) which aims at predicting the preference of items for a particular user based on the items previously rated by all users. The rating expressed in different scores (such as a 1-5 scale in Netflix™) can be explicitly given by users with many of these systems. However, in many more situations, it also can be implicitly expressed by users' behaviors such as click or not-click and bookmark or not-bookmark. These forms of implicit ratings are more common and easier to obtain.

Although the advantages are clear, a drawback of implicit rating, especially in situations of data sparsity, is that it is hard to identify representative negative examples. All of the negative examples and missing positive examples are combined together and cannot be distinguished.

One approach to solving this problem has been to label negative examples to convert the data into a classical CF problem. But this approach can be very expensive, or even inoperable, because the users generating the preference data will not bear the burden. In fact, based on some user studies, if a customer is asked to provide many positive and negative examples before the system performs well, he/she may decline to use the system.

Another possible solution is to treat all the missing data as negative examples. One drawback of this system is that it biases the recommendation results because some of the missing data might be positive (just not seen or understood). On the other hand, if missing items are treated as unknown, that is, all the missing examples are ignored and the positive examples are only utilized, a trivial solution arising from this approach is that all the predictions on missing values are positive examples. All missing as negative and missing as unknown (no negatives) are therefore two extreme strategies in one-class filtering.

The present invention addresses this issue by balancing the extent to which missing values are treated as negative examples. In accordance with one embodiment of the disclosure, illustrated generally in FIG. 1, a collaborative filtering method for evaluating a group of items to aid in predicting utility of items for a particular user is provided, including assigning (at 12) an item value of either known or missing to each item of the group of items. Once the items are classified as either known or missing, the method can include applying 14 a modification scheme to the item values of the missing items to assign a confidence value to each of the item values of the missing items to thereby generate a group of modified item values. As discussed in more detail below, a variety of modification schemes can be utilized. After modification of the item values of the missing data, at 16 the group of items having modified item values and the group of known items can be evaluated to generate a prediction of utility of items for a particular user.

The evaluation of the modified item values and the known items can be carried out with processes that would be appreciated by one of ordinary skill in the art having possession of this disclosure. One non-limiting example of a suitable process includes the application of a bagging algorithm (e.g., bootstrap aggregating) to the group of items having modified item values and the group of known items in order to assess utility of the items for a particular user.

The present invention can be applied to a variety of types of items that can be web data objects including, without limitation, products, services, webpages, audio files, video files, image files, and hyperlinks, for example. The present system can be incorporated into web-based interfaces (e.g., for use with on-line vendors), and/or a variety of other applications that utilize collaborative filtering techniques. The present invention is particularly well suited for use with very sparse data, such as that encountered with the world-wide web, where many thousands or millions of web sites, web pages and documents/files, etc. may be of interest.

As discussed above, the technique utilized to weigh or modify the missing item values can vary. In one embodiment, however, the modification of the item values of the missing items can take one of two forms: a weighting scheme or a sampling scheme. In each of these types of modification, three differing example models can be utilized: a first model in which a uniform weight (or sampling) is applied to each of the item values of the missing items; a second model that is a user-based approach in which a weight or sampling is applied to the item values of the missing items based on a user-positive history; and a third model that is an item-based approach in which a weight or sampling is applied to the item values of the missing items based on an item-positive history.

As used herein, the terms "item-positive" and "user-positive" histories are to be understood to refer to information associated with either an item (or items) or a user (or users) based on past events. For example, item-positive history can include information relating to how often an item was triggered as positive in the past (e.g., how many times users read a particular web page). User-positive history relates to the behavior of a particular user as it relates to various items (for example, a particular user's behavior may indicate that he or she has taken the time to read numerous web pages; as such, it may be assumed, with more confidence, that a web page visited by that user was actually read by that user). Any of these techniques can be applied for both weight-based modification and sampling-based modification schemes.

The following terminology will be utilized in the present discussion. It is assumed that the system is evaluating "m" users and "n" items and the previous rating (or viewing) information stored in a matrix R. The element of R takes value 1, which represents a positive example, or missing, which indicates an unknown (positive or negative) example. The task can be viewed as identifying the missing positive examples based on R. This is what is referred to as One-Class Collaborative Filtering (OCCF). Capital letters are used herein to denote a matrix. Given a matrix A, $A_{ij}$ represents its element, $A_{i\cdot}$ indicates the i-th row of A, $A_{\cdot j}$ symbolizes the j-th column of A, and $A^T$ stands for the transpose of A.

One embodiment of the invention addresses the one-class collaborative filtering problem based on a weighted low-rank approximation technique. The method uses low weights on the error terms of negative examples in the least squares objective function (see Equation 1 below). Given a rating matrix $R=(R_{ij})_{m \times n} \in \{0,1\}^{m \times n}$ and a corresponding non-negative weight matrix $W=(W_{ij})_{m \times n} \in R^{m \times n}$, weighted low-rank approximation aims at finding a low rank matrix $X=(X_{ij})_{m \times n}$ minimizing the objective of a weighted Frobenius loss function as follows.

$$L(X) = \sum_{ij} W_{ij}(R_{ij} - X_{ij})^2. \qquad (1)$$

In the above objective function L(X) (Eq. (1)), $(R_{ij}-X_{ij})$ is the common square error term often seen in low-rank approximations, and $W_{ij}$ reflects the contribution of minimizing the term to the overall objective L(X). In OCCF, $R_{ij}$ is set to 1 for positive examples; for missing values, it is posited that most of them are negative examples. In one embodiment, all of the missing values are replaced with zeros. As there is a high confidence on the observed positive examples where $R_{ij}=1$, the corresponding weights $W_{ij}$ are set to 1. In contrast, the weights on "negative" examples are lowered. Generally, it is determined that $W_{ij} \in [0,1]$, where $R_{ij}=0$. Before discussing the weighting schemes for "negative" examples, it is illustrated how the optimization problem $\arg\min_X L(X)$ is solved effectively and efficiently.

Consider the decomposition $X=UV^T$ where $U \in R^{m \times d}$ and $V \in R^{n \times d}$. Note that usually the number of features d<<r where r=min(m,n) is the rank of the matrix R. Then the objective function (Eq. (1)) can be rewritten as follows.

$$L(U, V) = \sum_{ij} W_{ij}(R_{ij} - U_{i\cdot}V_{j\cdot})^2. \qquad (2)$$

To prevent overfitting, one can append a regularization term to the objective function L(Eq. (2)):

$$L(U, V) = \sum_{ij} W_{ij}(R_{ij} - U_{i\cdot}V_{j\cdot})^2 + \lambda(\|U\|_F^2 + \|V\|_F^2), \qquad (3)$$

or $$L(U, V) = \sum_{ij} W_{ij}((R_{ij} - U_{i\cdot}V_{j\cdot})^2 + \lambda(\|U\|_F^2 + \|V\|_F^2)). \qquad (4)$$

In Eq. (3) and Eq. (4), the symbol F denotes the Frobenius norm. Note that Eq. (4) subsumes the special case of regularized low-rank approximation. The present disclosure extends this approach to weighted ALS (wALS). Now we focus on minimizing the objective function L(Eq. (4)) to illustrate how wALS works.

Taking partial derivatives of L with respect to each entry of U and V, we obtain:

$$\frac{1}{2}\frac{\partial L(U,V)}{\partial U_{i,k}} = \sum_j W_{ij}(U_{i\cdot}V_{j\cdot}^T - R_{ij})V_{jk} + \lambda\left(\sum_j W_{ij}\right)U_{ik}, \qquad (5)$$

$$\forall\, 1 \le i \le m,\, 1 \le k \le d.$$

Then we have $$\frac{1}{2}\frac{\partial L(U,V)}{\partial U_{i\cdot}} =$$

$$\frac{1}{2}\left(\frac{\partial L(U,V)}{\partial U_{i1}}, \ldots, \frac{\partial L(U,V)}{\partial U_{id}}\right) = U_{i\cdot}\left(VV_1 + \lambda\left(\sum_j W_{ij}\right)I\right) - R_{i\cdot}V_1,$$

where $V_1=\tilde{W}_{i\cdot}V \in R^{n \times d}$, $\tilde{W}_{i\cdot} \in R^{n \times n}$ is a diagonal matrix with the elements of $W_{i\cdot}$ on the diagonal, and I is a d-by-d identity matrix. Fixing V and solving $$\frac{\partial L(U,V)}{\partial U_{i\cdot}} = 0,$$

we have $$U_{i\cdot} = R_{i\cdot}V_1\left(V^TV_1 + \lambda\left(\sum_j W_{ij}\right)I\right)^{-1}, \forall\, 1 \le i \le m. \qquad (6)$$

Notice that the matrix $$V^TV_1 + \lambda\left(\sum_j W_{ij}\right)I$$

is strictly positive definite, thus invertible. It is not difficult to prove that without regularization, $V^TV_1=V^T\tilde{W}_{i\cdot}V$ can be a degenerate matrix which is not invertible.

Similarly, given a fixed U, we can solve V as follows.

$$V_{j\cdot} = R_{\cdot j}^T U_1 \left( U^T U_1 + \lambda \left( \sum_i W_{ij} \right) I \right)^{-1}, \forall\, 1 \le j \le m. \quad (7)$$

---
Algorithm 1 Weighted Alternating Least Squares (wALS)
---
Require: data matrix R, weight matrix W, rank d
Ensure: Matrices U and V with ranks of d
   Initialize V
   repeat
     Update $U_{i\cdot}$, ∀i with Eq. (6)
     Update $V_{j\cdot}$, ∀j with Eq. (7)
   until convergence.
   return U and V
--- where $U_1 = \tilde{W}_{\cdot j} U \in R^{m \times d}$ and $\tilde{W}_{\cdot j} \in R^{m \times m}$ is a diagonal matrix with the elements of $W_{\cdot j}$ on the diagonal.

Based on Eq. (6) and Eq. (7), the following iterative algorithm for wLRA with regularization (based on Eq. (4)) is proposed. First, the matrix V is normalized with Gaussian random numbers with zero mean and small standard deviation (we use 0.01 in our experiments). Next, the matrix U is updated as per Eq. (6) and then update the matrix V based on Eq. (7). These iterative update procedures are repeated until convergence. The above process is summarized in Algorithm 1 which is referred to as Weighted Alternating Least Squares (wALS). Note that for the objective function Eq. (3) with a uniform regularization term, only $(\Sigma_j W_{ij})$ in Eq. (6) and $(\Sigma_i W_{ij})$ in Eq. (7) to 1 need to be changed.

TABLE 1

Weighting Scheme Examples

|  | Pos Examples | "Neg" Examples |
| --- | --- | --- |
| Uniform | $W_{ij} = 1$ | $W_{ij} = \delta$ |
| User-Oriented | $W_{ij} = 1$ | $W_{ij} \propto \Sigma_j R_{ij}$ |
| Item-Oriented | $W_{ij} = 1$ | $W_{ij} \propto m - \Sigma_i R_{ij}$ |

As discussed above, the matrix W is helpful in the performance of OCCF. W=1 is equivalent to the case of AMAN with the bias discussed above. The basic idea of correcting the bias is to let $W_{ij}$ involve the credibility of the training data (R) used to build a collaborative filtering model. For positive examples, they have relative high likeliness to be true. The system allows $W_{ij}=1$ for each pair of (i,j) that $R_{ij}=1$. For missing data, it is very likely that most of them are negative examples. For instance, in social bookmarking, a user has very few web pages and tags; or for news recommendation, a user does not read most of the news. That is why previous studies make the AMAN assumption, although it biases the recommendations. However, the present disclosure sets forth the proposition that the confidence of missing values as being negative is not as high as of non-missing values being positive. Therefore, essentially, the system gives lower weights to the "negative" examples. The first exemplary weighting scheme utilized assumes that a missing data is a negative example and has an equal chance over all users or all items, that is, it uniformly assign a weight $\delta \in [0,1]$ for "negative" examples. The second exemplary weighting scheme posits that if a user has more positive examples, it is more likely that he or she does not like the other items, that is, the missing data for this user is negative with higher probability.

The third exemplary weighting scheme assumes that if an item has fewer positive examples, the missing data for this item is negative with higher probability. These three schemes are summarized in the following table.

In accordance with another embodiment of the disclosure, a stochastic method is provided based on negative example sampling for OCCF. Initially, negative examples are sampled from missing values. Based on an assumed probability distribution, the system generates a new matrix R including all positive examples in R. In a further step, for each R, the rating matrix is re-constructed by a special version of wALS. Further, the system combines all the R with equal weights generating a matrix R which approximates R. This method is referred to herein as sampling ALS Ensemble (sALS-ENS).

Generally speaking, since there are too many negative examples (compared to positive ones), it is costly and not necessary to learn the model on all entries of R. The idea of sampling can help us to solve the OCCF problem. In one embodiment, the invention can generate new training data from the original training data R by negative example sampling, given a sampling probability matrix P. As OCCF is a class-imbalanced problem, where positive examples are very sparse, we transfer all positive examples to the new training set. We then sample negative examples from missing data based on P and the negative sample size q.

---
Algorithm 2 Negative Example Sampling
---
Require: matrix $R \in R^{m \times n}$, matrix $\hat{P} \in R^{m \times n}$, sample size q
Ensure: matrix $\tilde{R}$
   $Z = \Sigma_{\{i,j\} \in \{R_{ij}=0\}} \hat{P}_{ij}$
   for all i,j do
     if $R_{ij} = 1$ then
       $\tilde{R}_{ij} = 1$
     else
       $P_{ij} = q \times \hat{P}_{ij}/Z$;
       if $P_{ij} >$ random( ) then
         %% random( ) samples uniformly from [0, 1]
         $\tilde{R}_{ij} = -1$
       else
         $\tilde{R}_{ij} = 0$
       end if
     end if
   end for
   return $\tilde{R}$
---

Figure 2:
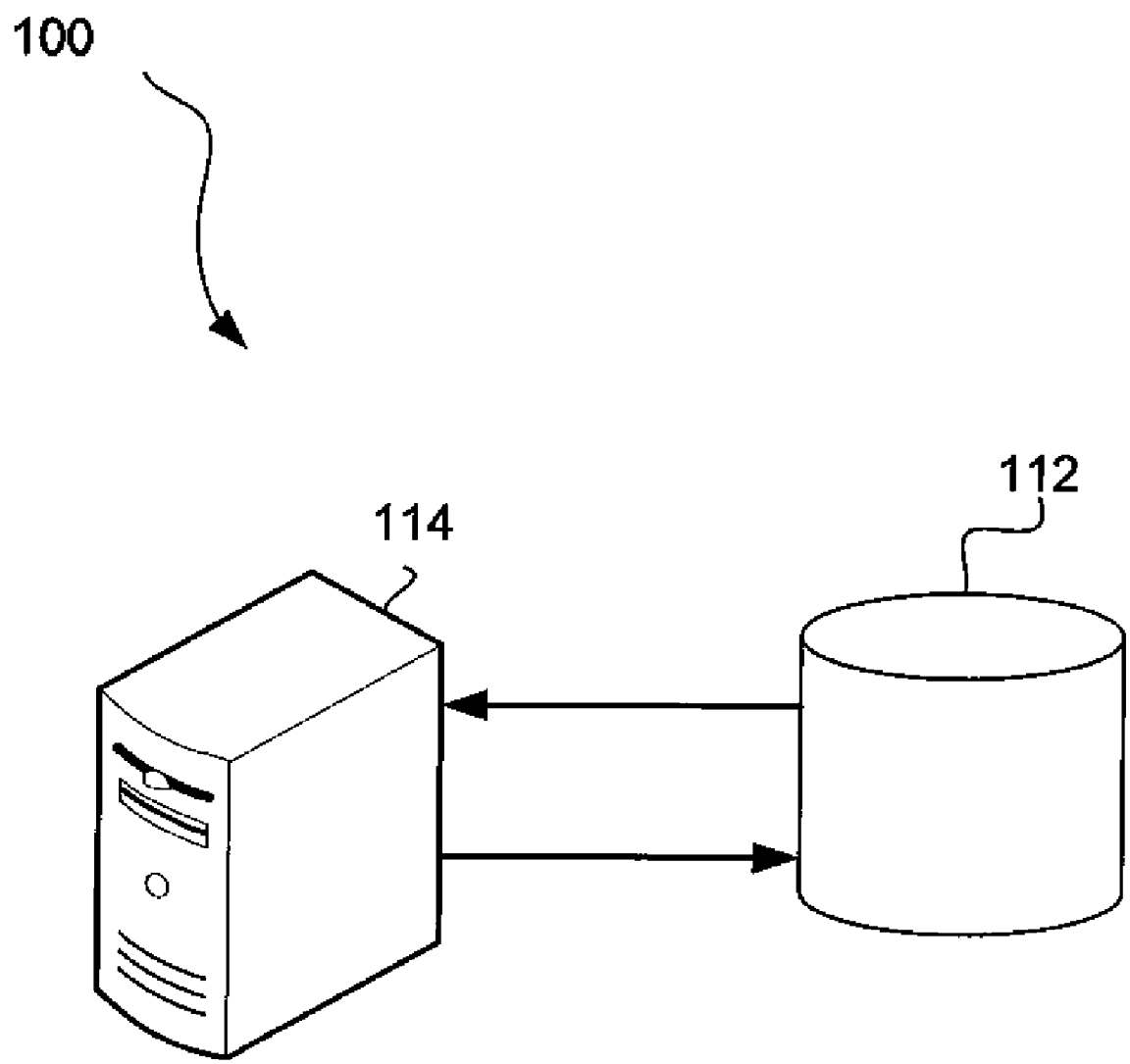
FIG. 2 is a schematic representation of a system for performing collaborative filtering for evaluating a group of items to aid in predicting utility of items for a particular user.

While the present disclosure can be carried out using a variety of hardware, one exemplary schematic system is illustrated in FIG. 2. Here it can be seen that a system 100 for performing collaborative filtering on a group of items to aid in predicting utility of items for a particular user can include a database 112. The database can contain information relating to a group of items, and a processor can be in communication with the database and can be operable to: assign a value of either known or missing to each item of the group of items; apply a modification scheme to the item values of the missing items to assign a confidence value to each of the item values of the missing items to thereby generate a group of modified item values; and/or evaluate the group of modified items and known items to generate a prediction of utility of items for a particular user.

The various devices of the exemplary system illustrated in FIG. 2 are shown schematically for illustrative purposes only. It is understood that one of ordinary skill in the art, having possession of this disclosure, could readily adapt the present system for use with a variety of known computing devices.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A collaborative filtering method for evaluating a group of items to aid in predicting utility of items for a particular user, comprising:
assigning an item value of either known or missing to each item of a group of web data objects;
applying a modification scheme to item values of the missing items to assign a confidence value to each of the item values of the missing items, thereby generating a group of modified item values; and
evaluating the group of items having modified item values and the group known items to generate a prediction of utility of items for a particular user.

2. The method of claim 1, wherein evaluating the group of items having modified item values and the group of known items comprises applying a bagging algorithm to the group of items having modified item values and the group of known items.

3. The method of claim 1, wherein applying a modification scheme comprises applying a weighting scheme to the item values of the missing items to assign a confidence value to each of the item values to thereby generate the group of modified item values.

4. The method of claim 3, wherein the weighting scheme comprises applying a uniform weight to each of the item values of the missing items.

5. The method of claim 3, wherein the weighting scheme comprises applying a weight to each of the item values of the missing items based on a user-positive history.

6. The method of claim 3, wherein the weighting scheme comprises applying a weight to each of the item values of the missing items based on an item-positive history.

7. The method of claim 1, wherein applying the modification scheme comprises applying a sampling scheme to the item values of the missing items to assign a confidence value to each of the item values of the missing items to thereby generate the group of modified items.

8. The method of claim 7, wherein the sampling scheme includes uniformly sampling each of the item values of the missing items.

9. The method of claim 7, wherein the sampling scheme includes sampling the item values of the missing items based on a user-positive history.

10. The method of claim 7, wherein the sampling scheme includes sampling the item values of the missing items based on an item-positive history.

11. The method of claim 1, wherein the items of the web data objects are selected from the group consisting of products, services, webpages, audio files, video files, image files, and hyperlinks.

12. A system for performing collaborative filtering on a group of items to aid in predicting utility of items for a particular user, comprising:
a) a database which contains information relating to a group of items; and
b) a processor adapted to:
i) assign a value of either known or missing to each item of the group of items;
ii) apply a modification scheme to the item values of the missing items to assign a confidence value to each of the item values of the missing items to thereby generate a group of modified item values; and
iii) evaluate the group of modified items and known items to generate a prediction of utility of items for a particular user.

13. The system of claim 12, wherein the processor is configured to apply a modification scheme to the item values of the missing items by applying a weighting scheme to the item values of the missing items to assign a confidence value to each of the item values to thereby generate the group of modified item values.

14. The system of claim 13, wherein the weighting scheme comprises applying a uniform weight to each of the item values of the missing items.

15. The system of claim 13, wherein the weighting scheme comprises applying a weight to each of the item values of the missing items based on a user-positive history.

16. The system of claim 13, wherein the weighting scheme comprises applying a weight to each of the item values of the missing items based on an item-positive history.

17. The system of claim 12, wherein applying the modification scheme comprises applying a sampling scheme to the item values of the missing items to assign a confidence value to each of the item values to thereby generate the group of modified item values.

18. The system of claim 17, wherein the sampling scheme includes sampling the item values of the missing items based on a user-positive history.

19. The system of claim 17, wherein the sampling scheme includes sampling the item values of the missing items on an item-positive history.

20. The system of claim 12, wherein the items of the web data objects are selected from the group consisting of: products, services, webpages, audio files, video files, image files and hyperlinks.

* * * * *